Patented Sept. 16, 1924.

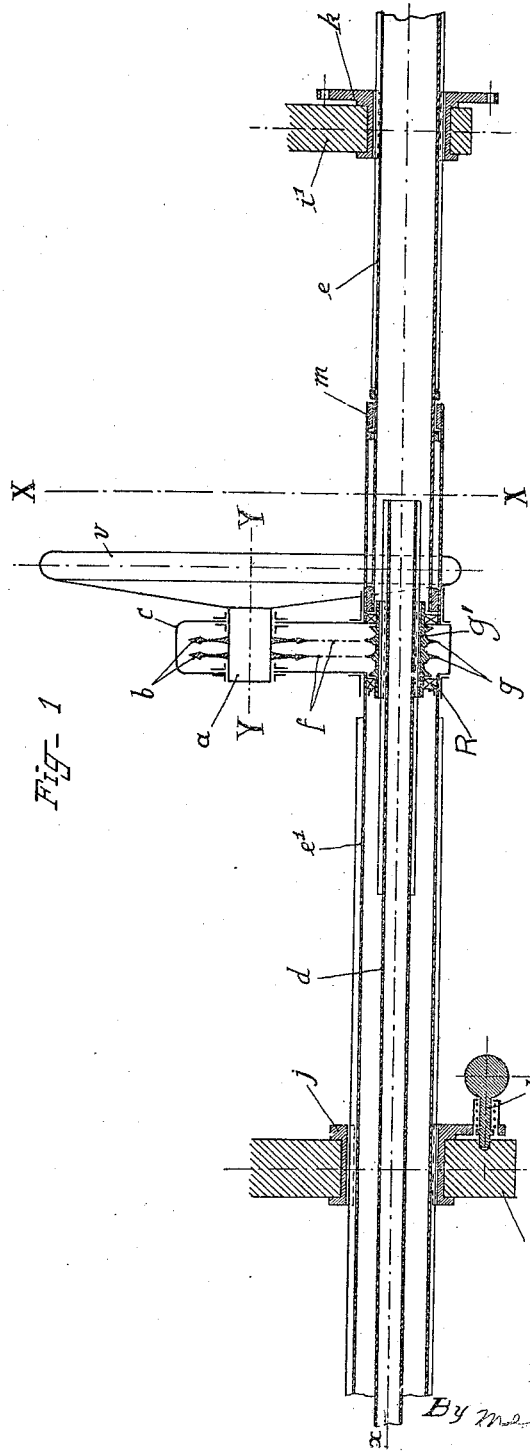

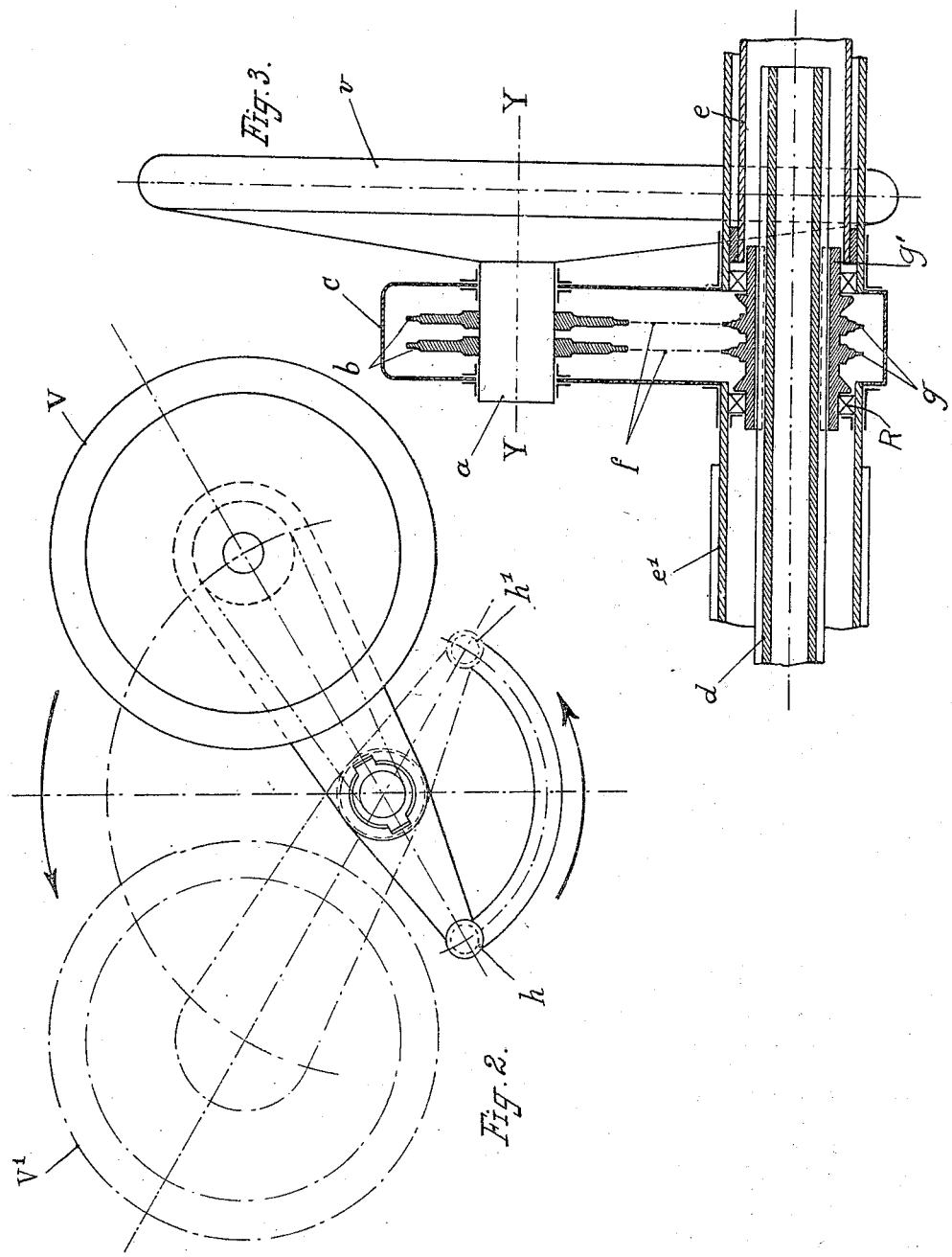

1,508,591

UNITED STATES PATENT OFFICE.

LOUIS BREGUET, OF PARIS, FRANCE, ASSIGNOR TO SOCIETE ANONYME DES ATELIERS D'AVIATION LOUIS BREGUET, OF PARIS, FRANCE.

MEANS FOR CONTROLLING AEROPLANES.

Application filed November 8, 1921. Serial No. 513,720.

*To all whom it may concern:*

Be it known that I, LOUIS BREGUET, residing at Paris, France, engineer, a citizen of the Republic of France, have invented certain new and useful Improvements in and Relating to Means for Controlling Aeroplanes, of which the following is a specification.

This invention relates to means for controlling aeroplanes and has for its object an improved handle or wheel adapted to operate the controlling means, having the essential characteristic feature of being movable and therefore of being capable of being secured at will in front of any one of the pilots either in station or in full flight.

This controlling handle is of the kind which comprises a hand wheel the rotation of which operates the control of the transverse stability and the longitudinal displacements of which towards the front or rear ensure the control of the longitudinal stability.

The particular feature of the invention resides in the fact that the whole of the controlling handle, that is, the wheel with its chains, can be angularly displaced by rotation about the axis of the tubular shaft of the transverse stability control, without rotating the said tubular shaft, the said wheel being locked in one or the other of the two extreme positions it is adapted to take, positions in which it is situated either in front of one or in front of the other of the two pilots.

The following description, in connection with the appended drawings which are given as an example only, will help in clearly understanding the manner in which the invention is carried out.

Fig. 1 is a diagrammatic section of the whole of the movable controlling handle.

Fig. 2 is a transverse section along XX of Fig. 1;

Fig. 3 is a view on an enlarged scale of the portion of Fig. 1 showing the controlling chains.

In the particular manner of carrying out the invention illustrated in these drawings, the whole of the device, that is, the wheel $v$, its spindle, $a$, the sprocket wheel $b$, and the casing $c$ are adapted to rotate through a certain angle about the axis $xx$ which is also that of the tubular shaft $d$ of the control of the warping and of the tube $e$ of the control of the depth. The hand-wheel can therefore be brought in the position shown in full lines, V, Fig. 2 or in broken lines, $V^1$, that is before one or the other of the two pilots. During this displacement, which takes place in the direction of the arrow, if the wheel occupies the position V (Fig. 2), or in the opposite direction, the chains $f$ run on the pinions $g$ which do not participate to the displacement of the said handle. Pinions $g$ are carried by a hub $g'$ constituting the pivot around which arm $c$ turns. Ball-bearings R, shown diagrammatically in Figs. 1 and 3, are interposed between the tubular pivot and the casing so that the latter may be angularly displaced with reference to the pivot without causing the same to rotate.

It is essentially necessary to provide a locking arrangement maintaining the controlling handle in one or the other of its working positions. This may be accomplished, for instance, by means of a bolt $h$ engaging an upright or fixed part $i$ of the body and carried by the collar $j$; the latter is secured by a sliding key or by grooves on the tube $e^1$ (which is a prolongation of the tube $e$) integral with the casing $c$. In these conditions when the bolt $h$ is in engagement, the casing and therefore the hand-wheel are locked rotationally. It is to be remarked however, that they can take an axial displacement owing to the sliding key or groove mounting. This bolt can occupy one or the other of the positions $h$ or $h^1$ according to whether the hand-wheel is at V or $V^1$.

The hand-wheel being locked in one position the control for warping, depth and direction takes place in the following manner:

*Warping.*—The rotation of the hand-wheel about the axis YY produces, by means of the pinions $b$, of the two chains $f$ and of the pinions $g$, the rotation of the shaft $d$ of the control of the warping. This shaft can only turn, without displacing itself in a direction parallel to its axis.

*Depth.*—The whole of the casing $c$ and of the hand-wheel V can be displaced axially and this movement is transmitted by projecting pieces or a collar $m$ to the shaft $e$ of the control of the depth rudder.

*Direction.*—This same shaft $e$ receives an independent movement of rotation besides its movement of translation, and this movement is transmitted to the direction rudder.

For this purpose the rudder bar transmits its rotational movement to a plate $k$ grooved or mounted with a sliding key upon the shaft $e$ and rotating within a fixed portion $i^1$ of the body. Movements of plate $k$ are transmitted to the direction rudder by suitable connections (not shown) between the rudder and said plate, and since these connections are well known in the art and form no part of the present invention a detailed description of the same is unnecessary.

What we claim and desire to secure by Letters Patent is:

1. A single hand-wheel support for the control of the warping and of the depth of aeroplanes and other aerial apparatus comprising means for causing the support to pivot at its lower end so as to be able to bring the wheel in front of one or the other of two pilots positioned side by side without exerting any action upon the controls, means for controlling the warping by rotation of the hand-wheel, and means for operating the depth rudder by a longitudinal displacement of the hand-wheel along its axis.

2. A single hand-wheel support for the control of the warping and of the depth of aeroplanes and other aerial apparatus, comprising an arm, a pivot at the bottom of the arm, a hand-wheel arranged upon the casing so as to be able to rotate about the pivot, means for controlling the warping by rotation of the hand-wheel, and means for controlling the depth rudder by longitudinal displacement of the hand-wheel along its axis.

3. A single hand-wheel support for the control of the warping and of the depth of aeroplanes and other aerial apparatus comprising an arm forming a casing, a tubular pivot at the bottom of the casing and about which the latter can be angularly displaced, a hand-wheel mounted on the upper part of the casing, a shaft for the control of warping passing through the tubular pivot, means for connecting the tubular pivot with the shaft so that said pivot in its rotary motion rotates said shaft and may slide longitudinally with reference to the latter, means for connecting the hand-wheel with the tubular pivot so that the rotation of said hand-wheel the tubular pivot will rotate thereby controlling the warping while in causing the whole of the casing and the hand-wheel to rotate about the tubular pivot in order to bring the hand-wheel before the one or the other of the seats of the two pilots no action will be exerted upon said tubular pivot, and means for controlling the depth rudder through a sliding motion of the casing, hand-wheel, and tubular pivot along the axis of said shaft.

4. A single hand-wheel support for the control of the warping and of the depth of aeroplanes and other aerial apparatus, comprising a casing, a tubular pivot arranged at the bottom of the casing and about which the latter can be displaced through an angle, a hand-wheel mounted at the upper part of the casing, a shaft for the control of the warping passing through the tubular pivot, means for connecting the tubular pivot with said shaft so that said pivot in its rotary motion rotates said shaft and may slide longitudinally with reference to the latter, pinions secured to the hand-wheel spindle and located in the casing, pinions secured to the tubular pivot, chains connecting the pinions, a long key connecting the tubular pivot with the shaft, ball-bearings interposed between the tubular pivot and the casing so that the casing may be angularly displaced with reference to the pivot without causing the same to rotate, said casing and pivot being movable together in a longitudinal direction, a tube connected with the casing and transmitting longitudinal displacements of the whole of the casing and of the hand-wheel to the means for the control of the depth rudder.

5. A single hand-wheel for the control of the warping and of the depth of the aeroplanes and other aerial apparatus comprising means for causing the support to pivot at its lower end so as to be able to bring the hand-wheel before one or the other of two pilots positioned side by side with this pivoting motion having no influence upon the controls, means for controlling the warping through a rotation of the hand-wheel, means for controlling the horizontal rudder through longitudinal displacement, that is to say a motion towards the front or rear, of the hand-wheel along its axis, and means for locking the support in one of its two positions.

In testimony whereof I have signed this specification.

LOUIS BREGUET.